United States Patent
Zhao

[11] Patent Number: 6,028,163
[45] Date of Patent: Feb. 22, 2000

[54] SOLUTION POLYMERIZATION OF HIGH MOLECULAR WEIGHT POLY (PHOSPHOESTERS) IN TOLUENE

[75] Inventor: Zhong Zhao, Towson, Md.

[73] Assignee: Guilford Pharmaceuticals Inc., Baltimore, Md.

[21] Appl. No.: 08/884,382

[22] Filed: Jun. 27, 1997

[51] Int. Cl.⁷ .................................................... C08G 69/26
[52] U.S. Cl. ........................................................... 528/340
[58] Field of Search ............................................. 528/340

[56] References Cited

U.S. PATENT DOCUMENTS

| | | | |
|---|---|---|---|
| 3,664,975 | 5/1972 | Kerst ........................................ | 528/353 |
| 3,876,564 | 4/1975 | Tanaka et al. .......................... | 528/169 |
| 4,072,658 | 2/1978 | Okamoto et al. ....................... | 528/353 |
| 4,156,663 | 5/1979 | Okamoto et al. ....................... | 528/353 |
| 4,365,056 | 12/1982 | Sunder-Plassmann ................. | 528/403 |
| 4,417,044 | 11/1983 | Parekh .................................... | 528/179 |
| 4,650,853 | 3/1987 | Carville et al. ......................... | 528/416 |
| 4,923,951 | 5/1990 | Kobayashi et al. ..................... | 528/48 |
| 4,954,609 | 9/1990 | Vora ........................................ | 528/353 |
| 5,130,411 | 7/1992 | Tanaka et al. .......................... | 528/388 |
| 5,262,516 | 11/1993 | Dellacoletta ............................ | 528/353 |
| 5,312,894 | 5/1994 | Kawakami et al. ..................... | 528/226 |
| 5,444,113 | 8/1995 | Sinclair et al. ......................... | 524/306 |
| 5,525,671 | 6/1996 | Ebato et al. ............................. | 525/53 |

FOREIGN PATENT DOCUMENTS

| | | |
|---|---|---|
| 0386757 | 9/1990 | European Pat. Off. . |
| 50-021093 | 3/1975 | Japan . |

OTHER PUBLICATIONS

Luo et al., "Synthesis and Antitumor Activity of Biodegradable Poly–Phosphamides", *Chemical Abstract*, 122:11, Abstract No. 122613 (Mar. 13, 1995).

(List continued on next page.)

*Primary Examiner*—Terressa Mosley
*Attorney, Agent, or Firm*—Gary M. Nath; Patricia M. Drost; Nath & Associates

[57] ABSTRACT

A process for making a high molecular weight poly (phosphoester) comprising the recurring monomeric units:

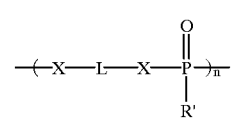

I wherein X is —O— or —NR"—, where R" is H or alkyl;
L is a divalent organic moiety, with the proviso that L cannot have the formula

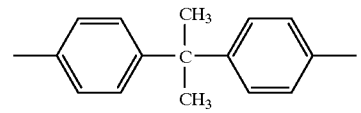

R' is H, alkyl, alkoxy, aryl, aryloxy, heterocyclic, or heterocycloxy; and n is from about 25 to 2000, is described. The process comprises the steps of:

(a) substantially dissolving p moles of a di-XH compound in a solvent comprising more than 75% toluene at a first temperature between about −75° C. and 60° C. to form a reaction mixture;

(b) while maintaining the reaction mixture at the first temperature, adding q moles, where p≈q, of a phosphorodihalo compound;

(c) gradually increasing said first temperature at a rate of less than about 2° C. per minute as necessary to achieve a second temperature between about 0° C. and 110° C., and mixing the reaction mixture at the second temperature to form the polymer of formula I; and (d) isolating the polymer of formula I.

38 Claims, 3 Drawing Sheets

Peak Results

| • | Ret Time (min) | Mn (Daltons) | Mw (Daltons) | MP (Daltons) | Polydispersity | % Poly > MWM1 | % Poly < MWM2 |
|---|---|---|---|---|---|---|---|
| 1 | 14.633 | 27047 | 78322 | 48324 | 2.895722 | | |

OTHER PUBLICATIONS

Fan et al., "Studies on the Drug Controlled Release of Materials of Polyphosphate Containing Tyrosine Ester," *Chemical Abstracts*, 124:18, Abstract No. 241898 (Apr. 18, 1996).

Penczek et al., "Phosphorus–Containing Polymers", *Handbook of Polymer Synthesis, Part B,* Chpt. 17, 1077–1132 (Kricheldorf ed. 1992).

Renier et al., "Development and Characterization of a Biodegradable Polyphosphate", *Journal of Biomedical Materials Research,* vol. 34, 95–104 (1997).

Mao et al., "Synthesis and Biological Properties of Polymer Immunoadjuvants", *Polymer Journal,* 25:5, 499–505 (1993).

SOLUTION POLYMERIZATION OF HIGH MOLECULAR WEIGHT POLY (PHOSPHOESTERS) IN TOLUENE

BACKGROUND OF THE INVENTION

1. Field of the Invention

The present invention relates to a solution polymerization process for making high molecular weight polymers containing phosphoester linkages, in particular those that degrade in vivo into non-toxic residues. The polymers made by the process of the invention are particularly useful as implantable medical devices and prolonged release drug delivery systems.

2. Description of the Prior Art

Polymers having phosphate linkages, called poly (phosphates), poly(phosphonates) and poly(phosphites), are known. The respective structures of these three classes of compounds, each having a different sidechain connected to the phosphorus atom, is as follows:

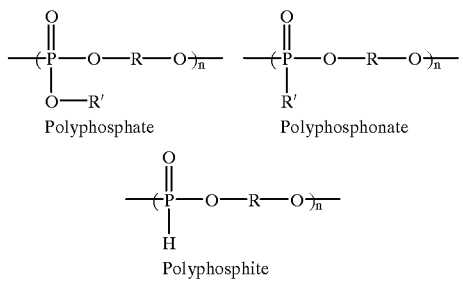

The versatility of these polymers comes from the versatility of the phosphorus atom, which is known for a multiplicity of reactions. Its bonding can involve the 3p orbitals or various 3s-3p hybrids; spd hybrids are also possible because of the accessible d orbitals. Thus, the physico-chemical properties of the poly(phosphoesters) can be readily changed by varying either the R or R' group. The biodegradability of the polymer is due primarily to the physiologically labile phosphoester bond in the backbone of the polymer. By manipulating the backbone or the sidechain, a wide range of biodegradation rates are attainable.

An additional feature of poly(phosphoesters) is the availability of functional side groups. Because phosphorus can be pentavalent, drug molecules or other biologically active substances can be chemically linked to the polymer. For example, drugs with —O-carboxy groups may be coupled to the phosphorus via an ester bond, which is hydrolyzable. The P—O—C group in the backbone also lowers the glass transition temperature of the polymer and, importantly, confers solubility in common organic solvents, which is desirable for easy characterization and processing.

The most common general reaction in preparing poly (phosphates) is a dehydrochlorination between a phosphorodichloridate and a diol according to the following equation:

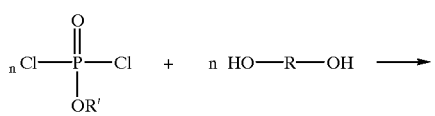

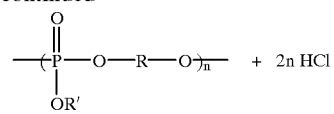

Most poly(phosphonates) are also obtained by condensation between appropriately substituted dichlorides and diols.

Poly(phosphites) have been prepared from glycols in a two-stage condensation reaction. A 20% molar excess of a dimethylphosphite is used to react with the glycol, followed by the removal of the methoxyphosphonyl end groups in the oligomers by high temperature.

A Friedel-Crafts reaction can also be used to synthesize poly(phosphates). Polymerization typically is effected by reacting either bis(chloromethyl) compounds with aromatic hydrocarbons or chloromethylated diphenyl ether with triaryl phosphates. Poly(phosphates) can also be obtained by bulk condensation between phosphorus diimidazolides and aromatic diols, such as resorcinol and quinoline, usually under nitrogen or some other inert gas.

High molecular weights have generally been possible by bulk polycondensation. However, rigorous conditions are often required, which can lead to chain acidolysis (or hydrolysis if water is present). Unwanted, thermally-induced side reactions, such as cross-linking reactions, can also occur if the polymer backbone is susceptible to hydrogen atom abstraction or oxidation with subsequent macro-radical recombination.

To minimize these side reactions, the polymerization can also be carried out in solution. Solution polycondensation requires that both the diol and the phosphorus component be soluble in a common solvent. Typically, a chlorinated organic solvent is used, such as chloroform, dichloromethane, or dichloroethane. The solution polymerization must be run in the presence of equimolar amounts of the reactants and a stoichiometric amount of an acid acceptor, usually a tertiary amine such as pyridine or triethylamine. The product is then typically isolated from the solution by precipitation with a non-solvent and purified to remove the hydrochloride salt by conventional techniques known to those of ordinary skill in the art, such as by washing with an aqueous acidic solution, e.g., dilute HCl.

Reaction times tend to be longer with solution polymerization than with bulk polymerization. However, because overall milder reaction conditions can be used, side reactions are minimized, and more sensitive functional groups can be incorporated into the polymer. The disadvantage of solution polymerization is that the attainment of high molecular weights, such as a molecular weight greater than about 10,000 to 20,000, is less likely.

Interfacial polycondensation can be used when high molecular weight polymers are desired at high reaction rates. Mild conditions minimize side reactions. Also the dependence of high molecular weight on stoichiometric equivalence between diol and dichloridate inherent in solution methods is removed. However, hydrolysis of the acid chloride may occur in the alkaline aqueous phase, since sensitive dichloridates that have some solubility in water are generally subject to hydrolysis rather than polymerization.

Toluene has been mentioned as a possible solvent in the solution polymerization of a variety of polymer products for a number of different reasons. For example, Kerst, U.S. Pat. No. 3,664,975 issued May 23, 1972, discloses the formation of fire-resistant polyurethane compositions by adding to the urethane-forming reaction mixture a substituted ethane diphosphonate, and toluene is mentioned as one of many different solvents that can be used when an inert liquid nonaqueous reaction medium is employed. See column 6, lines 56–61.

Okamoto et al., U.S. Pat. No. 4,156,663, discloses the preparation of phosphorous- and bromine-containing polymers. When the polymer is prepared by a solution polymerization, the solvents are preferably basic polar solvents, and the many examples provided of possibly useful solvents include toluene. See column 6, line 67 through column 7, line 7.

Renier et al., Development and Characterization of a Biodegradable Polyphosphate, *J. of Biomed. Materials Res.*, 34:95–104 (1997), discloses the preparation of a biodegradable polyphosphate polymer in toluene. Specifically, poly (bisphenol A-phenylphosphate) (Mn 18 kDa, Mw/Mn=3.2) is prepared by adding phenyl phosphodichloridate to bisphenol A in the presence of triethylamine and argon gas. However, it is known that bisphenol A is an unusually reactive diol for polycondensations.

Accordingly, there remains a need for a polymerization procedure for more standard, less reactive monomer reactants that will provide significantly higher molecular weight materials than would be produced with the usual solvents employed in solution polymerization reactions, even with less active polycondensation reactants and, at the same time, minimize side-reactions.

SUMMARY OF THE INVENTION

The process of the invention is for preparing a high molecular weight poly(phosphoester) comprising the recurring monomeric units of formula I:

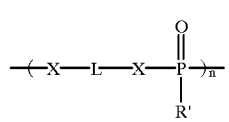

I wherein:
X is —O— or —NR"—, where R" is H or alkyl;
L is a divalent organic moiety, with the proviso that L cannot have the formula

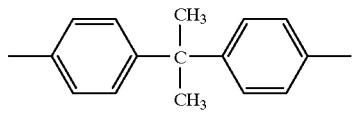

R' is H, alkyl, alkoxy, aryl, aryloxy, heterocyclic, or heterocycloxy; and
n is from about 25 to 2000,
the process comprising the steps of:
(a) substantially dissolving p moles of a di-XH compound having formula II:

H—X—L—X—H    II in a solvent comprising at least 75% toluene by volume at a first temperature between about −75° C. and +60° C. to form a reaction mixture;
(b) while maintaining the reaction mixture at the first temperature, adding q moles, where p≈q, of a phosphorodihalo compound of formula III:

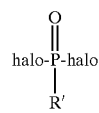

III wherein R' is defined as above and "halo" is Br, Cl or I;
(c) gradually increasing the first temperature as necessary at a rate of less than about 2° C. per minute to achieve a second temperature between about room temperature and 110° C., and mixing the reaction mixture at the second temperature to form the polymer of formula I; and
(d) isolating the polymer of formula I.

In another embodiment, the invention comprises the high molecular weight poly(phosphoester) made by the above-described process.

DETAILED DESCRIPTION OF THE INVENTION

Polymers of the Invention

Figure 1:
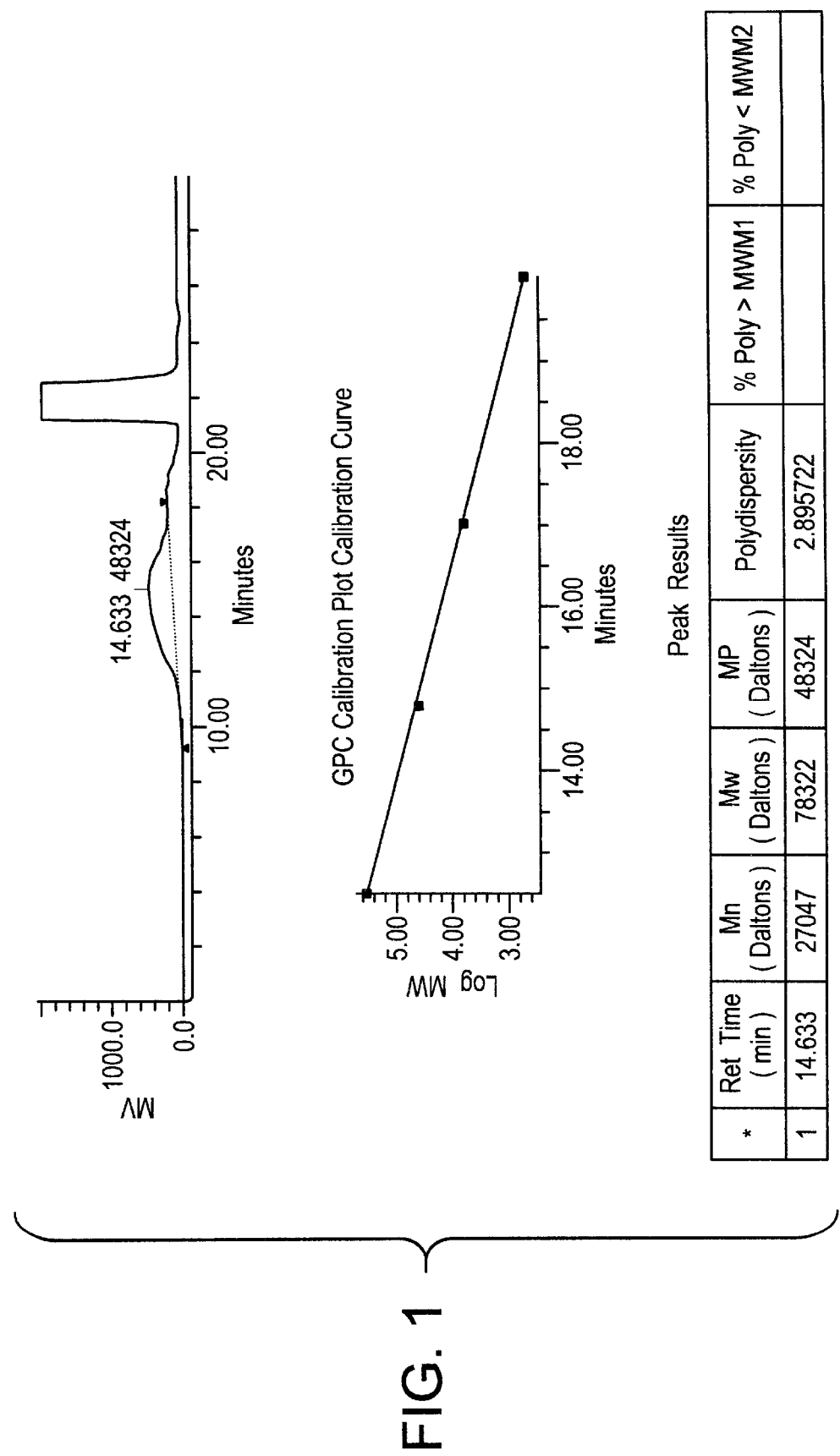
FIG. 1 shows a GPC chromatogram for poly(BHDPT-EOP/TC) (100:50:50) after refluxing overnight in toluene.

As used herein, the term "aliphatic" refers to a linear, branched, or cyclic alkane, alkene, or alkyne. Preferred aliphatic groups in the poly(phosphate) polymer of the invention are linear or branched and have from 1 to 10 carbons, preferably being linear groups having from 1 to 7 carbon atoms.

As used herein, the term "aromatic" refers to an unsaturated cyclic carbon compound with 4n+2 π electrons.

As used herein, the term "heterocyclic" refers to a saturated or unsaturated ring compound having one or more atoms other than carbon in the ring, for example, nitrogen, oxygen or sulfur.

The polymer of the invention comprises the recurring monomeric units shown in formula I:

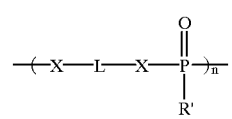

I wherein X is —O— or —NR"—, where R" is H or alkyl such as methyl, ethyl, isopropyl or tert-butyl. Preferably, X is —O—.

L in formula I can be any divalent organic moiety so long as it does not have the formula

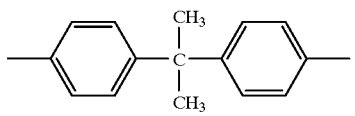

and it does not interfere with the polymerization reaction of the corresponding monomer. Preferably, L is not halogenated. Also, L preferably comprises an aromatic ring, an aliphatic ring, a straight-chain or branched aliphatic group, or a carbonyl group. Specifically, L can contain an aliphatic group, for example, alkylene, such as ethylene, 1,2-dimethylethylene, n-propylene, isopropylene, 2,2-dimethylpropylene or tert-butylene, tert-pentylene, n-hexylene, n-heptylene and the like; an alkylene group substituted with a non-interfering substituent; or a cycloaliphatic group such as cyclopentylene, 2-methylcyclopentylene, cyclohexylene, cyclohexenylene and the like.

L can contain a divalent aromatic group, such as phenylene, benzylene, naphthalene, phenanthrenylene, and the like, or a divalent aromatic group substituted with a non-interfering substituent. L can also include a divalent heterocyclic group, such as pyrrolylene, furanylene, thiophenylene, alkylene-pyrrolylene-alkylene, pyridylene, pyridinylene, pyrimidinylene and the like, or any of these groups substituted with a non-interfering substituent.

Even more preferably, however, L is selected from the group consisting of:

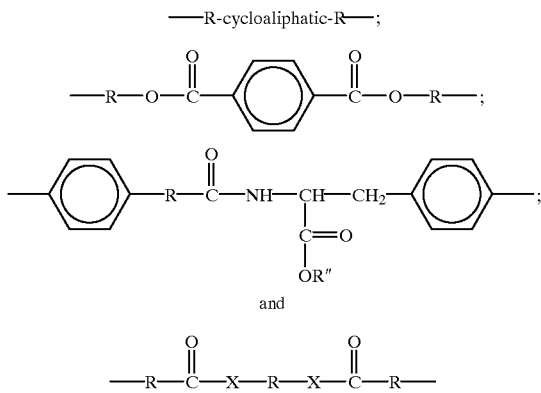

wherein R is branched or straight-chain alkylene, and R''' is H, alkyl, aryl or heterocyclyl. Preferably, R is an alkylene group having from 1 to 7 carbon atoms and, most preferably, R is selected from the group consisting of ethylene and 2,2-dimethyl propylene.

R' in formula I is H, alkyl, alkoxy, aryl, aryloxy, heterocyclic, or heterocycloxy. Examples of useful alkyl groups include methyl, ethyl, n-propyl, i-propyl, n-butyl, tert-butyl, —$C_8H_{17}$, and the like. Also included by "alkyl" are alkyl groups that are substituted with a non-interfering substituent, such as halogen, or alkyl conjugated to a biologically active substance to form a pendant drug delivery system.

When R' is aromatic, it typically contains from about 5 to about 14 carbon atoms, preferably about 5 to 12 carbon atoms and, optionally, can contain one or more rings that are fused to each other. Examples of particularly suitable aromatic groups include phenyl, naphthyl, anthracenyl, phenanthrenyl and the like.

When R' is heterocyclic, it typically contains from about 5 to 14 ring atoms, preferably from about 5 to 12 ring atoms, and one or more heteroatoms. Examples of suitable heterocyclic groups include furan, thiophene, pyrrole, isopyrrole, 3-isopyrrole, pyrazole, 2-isoimidazole, 1,2,3-triazole, 1,2,4-triazole, oxazole, thiazole, isothiazole, 1,2,3-oxadiazole, 1,2,4-oxadiazole, 1,2,5-oxadiazole, 1,3,4-oxadiazole, 1,2,3,4-oxatriazole, 1,2,3,5-oxatriazole, 1,2,3-dioxazole, 1,2,4-dioxazole, 1,3,2-dioxazole, 1,3,4-dioxazole, 1,2,5-oxatriazole, 1,3-oxathiole, 1,2-pyran, 1,4-pyran, 1,2-pyrone, 1,4-pyrone, 1,2-dioxin, 1,3-dioxin, pyridine, N-alkyl pyridinium, pyridazine, pyrimidine, pyrazine, 1,3,5-triazine, 1,2,4-triazine, 1,2,3-triazine, 1,2,4-oxazine, 1,3,2-oxazine, 1,3,5-oxazine, 1,4-oxazine, o-isoxazine, p-isoxazine, 1,2,5-oxathiazine, 1,2,6-oxathiazine, 1,4,2-oxadiazine, 1,3,5,2-oxadiazine, azepine, oxepin, thiepin, 1,2,4-diazepine, indene, isoindene, benzofuran, isobenzofuran, thionaphthene, isothionaphthene, indole, indolenine, 2-isobenzazole, 1,4-pyrindine, pyrando[3,4-b]-pyrrole, isoindazole, indoxazine, benzoxazole, anthranil, 1,2-benzopyran, 1,2-benzopyrone, 1,4-benzopyrone, 2,1-benzopyrone, 2,3-benzopyrone, quinoline, isoquinoline, 1,2,-benzodiazine, 1,3-benzodiazine, naphthyridine, pyrido [3,4-b]-pyridine, pyrido[3,2-b]-pyridine, pyrido[4,3-b] pyridine, 1,3,2-benzoxazine, 1,4,2-benzoxazine, 2,3,1-benzoxazine, 3,1,4-benzoxazine, 1,2-benzisoxazine, 1,4-benzisoxazine, carbazole, xanthrene, acridine, purine, and the like. Preferably, when R' is heterocyclic, it is selected from the group consisting of furan, pyridine, N-alkylpyridine, 1,2,3- and 1,2,4-triazoles, indene, anthracene and purine.

In a particularly preferred embodiment, R' is an alkoxy group or a phenoxy group and, even more preferably, an alkoxy group having from 1 to 7 carbon atoms. Most preferably, R' is an ethoxy group or a hexyloxy group.

Preferably, the polymers of the invention are biodegradable, i.e., they can be degraded by the body during in vivo therapy. This generally involves breaking down the polymer into its monomeric subunits. In principle, the ultimate hydrolytic breakdown products are typically phosphate, an alcohol, and a diol, all of which are potentially non-toxic. The intermediate oligomeric products of the hydrolysis may have different properties, but the toxicology of a biodegradable polymer intended for implantation or injection, even one synthesized from apparently innocuous monomeric structures, is typically determined after one or more in vitro toxicity analyses.

The polymer of the invention is preferably sufficiently pure to be biocompatible itself and remains biocompatible upon biodegradation. By "biocompatible" is meant that the biodegradation products of the polymer are non-toxic and result in only minimal tissue irritation when implanted or injected into vasculated tissue.

The polymer of the invention is preferably soluble in one or more common organic solvents for ease of fabrication and processing. Common organic solvents include solvents such as chloroform, dichloromethane, acetone, ethyl acetate, DMAC, N-methyl pyrrolidone, dimethylformamide, and dimethylsulfoxide. The polymer is preferably soluble in at least one of the above solvents.

Polymerization Process

The function of the polymerization process of the invention is to phosphorylate the di-XH starting material of formula II with the phosphorodihalo compound of formula III to form a high molecular weight poly(phosphoester). The first step in making the polymer of formula I is to substantially dissolve p moles of a di-XH compound in a solvent comprising more than 75% toluene at a first temperature between about −75° C. and +60° C. to form a reaction mixture, preferably between about −70° C. and room temperature. A solvent is used to ensure uniform distribution of the reactants relative to each other and the avoidance of undesirable side reactions.

The solvent used in the process of the invention comprises at least 75% toluene by volume and, preferably, at least 99.9% toluene by volume. However, minor amounts of one or more supplemental solvents can also be included, for example, halogenated solvents such as dichloroethane, dichloromethane, chloroform, or any of a wide variety of other organic solvents. When using a supplemental solvent, a useful set of parameters for selecting a suitable supplemental solvent includes:

1. inertness to the polymerization reaction;
2. good solubility for reactants and any catalysts used in the polymerization;
3. low water content, since some poly(phosphoester) compounds are sensitive to moisture;
4. relatively high boiling point so that the polymerization reaction may be performed at elevated temperature if advantageous; and
5. low solubility of salts formed during the polymerization reaction to drive the reaction further to completion.

By "substantially dissolving" is meant that, usually, at least upon heating, the compound of formula II dissolves completely in the solvent and remains completely dissolved, or becomes only somewhat cloudy, at the first temperature of the process. Cloudiness of the solution of the compound of formula II in the solvent may particularly be observed when the first temperature is significantly below room temperature. Some degree of insolubility of the compound of formula II can be tolerated so long as a significant proportion of the compound remains in solution and is available for reaction with the phosphorodihalo compound of formula III.

The first temperature can vary widely between about −75° C. and +60° C., preferably from about −70° C. to about room temperature. The first temperature should not be so low that the compound of formula II is substantially insoluble in the solvent of the invention. On the other hand, the first temperature should not be so high as to allow significant volatilization of the phosphorodihalo compound of formula III before it can react with the compound of formula II. Between these two limits, however, the first temperature is largely a matter of convenience.

When the first temperature is below room temperature, a cooling effect may be achieved by any convenient conventional means, such as by fitting the reaction vessel with a cooling water bath, placing it in an ice bath, or placing it into contact with dry ice, the cooling vapors emanating from dry ice or a bath of dry ice and an organic solvent, such as acetone, ethanol, isopropanol or the like.

The amount of solvent used in the process of the invention can vary widely but is usually greatly in excess of the molar amounts of the reactants present to ensure uniform distribution of the reactants. For example, the amount of solvent typically exceeds about 5 ml for each gram of the di-XH starting compound of formula II. Preferably, sufficient solvent is used to assure that there will be between 5 and 15 ml of so lvent per gram of compound of formula II.

Because the process of the invention is a polycondensation reaction in which an acid is generally produced as a by-product, e.g. HCl, an acid acceptor is advantageously present during the polymerization step (a). A particularly suitable class of acid acceptors comprises tertiary amines, such as pyridine, trimethylamine, triethylamine, substituted anilines and substituted aminopyridines. The most preferred acid acceptor is the substituted aminopyridine 4-dimethylaminopyridine ("DMAP").

In step (b) of the process of invention, while the reaction mixture is being maintained at the first temperature, q moles, where p≈q, of a phosphorodihalo compound of formula III is added. Formula III is shown below.

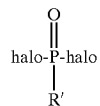

III wherein R' is defined as above, preferably lower alkyl, such as methyl, ethyl or isopropyl. Most preferably, R' is an ethyl group. The "halo" substituent can be Br, Cl or I but, preferably, is Cl. The phosphorodihalo compound of formula III can be advantageously freshly distilled prior to the process to ensure adequate purity for a successful polymerization.

In step (c) of the process of the invention, the first temperature is gradually increased as necessary at a rate of less than about 2° C. per minute to achieve a second temperature between about room temperature and 110° C. This gradual rate of changing temperature, when a temperature change is necessary, is important to ensure a uniform, steady rate of reaction between the compound of formula II and the phosphorodihalo compound of formula III. When the first temperature is not the same as the second temperature, any compound of formula II that is not yet dissolved in the solvent of the invention becomes completely dissolved and is allowed to react with the phosphorodihalo compound of formula III before any significant amount of phosphorodihalo compound of formula III vaporizes and escapes the reaction vessel containing the rest of the reaction mixture. Further, when the first temperature is lower than the second temperature, and the first temperature is changed too rapidly, the polymerization can become discontinuous, and phase separation can occur, resulting in the formation of a solid, insoluble gel, rather than a useful phosphoester polymer.

After any gradual temperature changes that are needed have been made, the remainder of step (c) takes place at the second temperature of the process. The second temperature also may vary widely, depending primarily upon the velocity of the polymerization desired and the susceptibility of the reactants to form side reactions. Preferably, however, the second temperature ranges from about 0° C. to about 110° C., more preferably from about room temperature to about 110° C. (the reflux temperature of toluene).

The time required for the remainder of step (c) can also vary widely, but is usually significantly shortened over what the reaction time would be with the other solvents typically used in solution polymerization reactions. The conventional wisdom in the past would have been to increase the polymerization time as needed to achieve the desired molecular weight. For example, the reaction can be monitored by GPC and simply continued until the molecular weight reaches the desired value.

However, with toluene as the primary solvent, the polycondensation reaction occurs surprisingly quickly while still achieving unexpectedly high molecular weights. As a general matter, the reaction time should not be so short that the desired molecular weight is not achieved, but also should not be so long that the reaction mixture gels. Preferably, this first polymerization step (a) takes place during a time between about 10 minutes and 18 hours.

The increase in molecular weight as a result of the process of the invention is significant. The molecular weight achieved is often at least 25% greater than the molecular weight achieved with when the identical reaction is with another standard solvent, such as dichloromethane. Preferably, the molecular weight is at least 50% greater and, even more preferably, at least 100% greater (two times greater) that when the identical reaction is run in dichloromethane as the solvent.

The actual molecular weights achieved with different phosphoester polymers can vary greatly, depending upon the monomers selected, the times and temperatures used for polymerization, the presence of one or more co-monomers, the amount of any supplemental solvent being used, and the like. Typically, however, the molecular weight varies between about 4,000 and 120,000 daltons, as measured by GPC. Preliminary experiments determining the molecular weight of these polymers by light scattering methods indicate higher molecular weight values than when measured by GPC, up to about 3 times the GPC-determined value.

However, what is significant is that the molecular weight achieved with a toluene solvent is almost always significantly higher than when the same reaction is run in a standard solvent. Further, contrary to the teachings in the art that toluene is no better or worse than any other solvent customarily used in solution polymerizations, the higher molecular weight poly(phosphoesters) is achieved without the formation of additional side-products that usually accompanies the achievement of high molecular weight materials in bulk or melt polymerizations.

Thus, the polymerization step of the invention using toluene as the primary solvent unexpectedly produces a higher molecular weight in unexpectedly shorter reaction times and under milder conditions without the formation of unwanted side-reactions. The precise mechanism by which this unexpectedly higher molecular weight is achieved is not clear. One theory is that the effect may be due to the greater similarity of the toluene molecule to many of the monomers used in the invention than the chlorinated solvents, such as chloroform or dichloromethane, that are commonly used. It is also possible that the increased molecular weight achieved may be due, at least in part, to the higher reflux temperature of toluene. However, this still would not explain the lack of side reactions at the higher temperature.

The polymer of formula I can be isolated from the reaction mixture by conventional techniques, such as by precipitating out, extraction with an immiscible solvent, evaporation, filtration, crystallization and the like. Typically, however, the reaction mixture is washed one or more times with a salt solution, such as a saturated NaCl solution to remove the neutralized acid by-product discussed above, and the polymer of formula I can then be isolated and purified by quenching with a non-solvent or a partial solvent, such as diethyl ether or petroleum ether.

The process of the invention may be performed in either batchwise fashion or on a continuous basis.

Polymer Compositions

The polymer of formula I can be used either alone or as a composition containing, in addition, a biologically active substance to form a variety of useful biodegradable materials. For example, the polymer of formula I can be used to produce a biosorbable suture, an orthopedic appliance or a bone cement for repairing injuries to bone or connective tissue, a laminate for degradable or non-degradable fabrics, or a coating for an implantable device, even without the presence of a biologically active substance.

Preferably, however, the polymer composition of the invention comprises a biologically active substance as well as the polymer of the invention.

The biologically active substance of the invention can vary widely with the purpose for the composition. The active substance(s) may be described as a single entity or a combination of entities. The delivery system is designed to be used with biologically active substances having high water-solubility as well as with those having low water-solubility to produce a delivery system that has controlled release rates. The term "biologically active substance" includes without limitation, medicaments; vitamins; mineral supplements; substances used for the treatment, prevention, diagnosis, cure or mitigation of disease or illness; or substances which affect the structure or function of the body; or pro-drugs, which become biologically active or more active after they have been placed in a predetermined physiological environment.

Non-limiting examples of useful biologically active substances include the following expanded therapeutic categories: anabolic agents, antacids, anti-asthmatic agents, anti-cholesterolemic and anti-lipid agents, anti-coagulants, anti-convulsants, anti-diarrheals, anti-emetics, anti-infective agents, anti-inflammatory agents, anti-manic agents, anti-nauseants, anti-neoplastic agents, anti-obesity agents, anti-pyretic and analgesic agents, anti-spasmodic agents, anti-thrombotic agents, anti-uricemic agents, anti-anginal agents, antihistamines, anti-tussives, appetite suppressants, biologicals, cerebral dilators, coronary dilators, decongestants, diuretics, diagnostic agents, erythropoietic agents, expectorants, gastrointestinal sedatives, hyperglycemic agents, hypnotics, hypoglycemic agents, ion exchange resins, laxatives, mineral supplements, mucolytic agents, neuromuscular drugs, peripheral vasodilators, psychotropics, sedatives, stimulants, thyroid and anti-thyroid agents, uterine relaxants, vitamins, and prodrugs.

Specific examples of useful biologically active substances from the above categories include: (a) anti-neoplastics such as androgen inhibitors, antimetabolites, cytotoxic agents, immunomodulators; (b) anti-tussives such as dextromethorphan, dextromethorphan hydrobromide, noscapine, carbetapentane citrate, and chlophedianol hydrochloride; (c) antihistamines such as chlorpheniramine maleate, phenindamine tartrate, pyrilamine maleate, doxylamine succinate, and phenyltoloxamine citrate; (d) decongestants such as phenylephrine hydrochloride, phenylpropanolamine hydrochloride, pseudoephedrine hydrochloride, and ephedrine; (e) various alkaloids such as codeine phosphate, codeine sulfate and morphine; (f) mineral supplements such as potassium chloride, zinc chloride, calcium carbonates, magnesium oxide, and other alkali metal and alkaline earth metal salts; (g) ion exchange resins such as cholestryramine; (h) anti-arrhythmics such as N-acetylprocainamide; (i) antipyretics and analgesics such as acetaminophen, aspirin and ibuprofen; (j) appetite suppressants such as phenyl-propanolamine hydrochloride or caffeine; (k) expectorants such as guaifenesin; (l) antacids such as aluminum hydroxide and magnesium hydroxide; (m) biologicals such as peptides, polypeptides, proteins and amino acids, hormones, interferons or cytokines and other bioactive peptidic compounds, such as hGH, tPA, calcitonin, ANF, EPO and insulin; and (n) anti-infective agents such as antifungals, anti-virals, antiseptics and antibiotics.

The biologically active substances are used in amounts that are therapeutically effective. While the effective amount of a biologically active substance will depend on the particular material being used, amounts of the biologically active substance from about 1% to about 65% have been easily incorporated into the present delivery systems while achieving controlled release. Lesser amounts may be used to achieve efficacious levels of treatment for certain biologically active substances.

Pharmaceutically acceptable carriers may be prepared from a wide range of materials. Without being limited thereto, such materials include diluents, binders and adhesives, lubricants, disintegrants, colorants, bulking agents, flavorings, sweeteners and miscellaneous materials such as buffers and adsorbents in order to prepare a particular medicated composition.

In its simplest form, a biodegradable therapeutic agent delivery system consists of a dispersion of the therapeutic agent in a polymer matrix. The therapeutic agent is typically released as the polymeric matrix biodegrades in vivo into soluble products that can be excreted from the body.

In a particularly preferred embodiment, an article is used for implantation, injection, or otherwise placed totally or partially within the body, the article comprising the biodegradable polymer composition of the invention. The biologically active substance of the composition and the copolymer of the invention may form a homogeneous matrix, or the biologically active substance may be encapsulated in some way within the copolymer. For example, the biologically active substance may be first encapsulated in a microsphere and then combined with the copolymer in such a way that at least a portion of the microsphere structure is maintained. Alternatively, the biologically active substance may be sufficiently immiscible in the polymer of the invention that it is dispersed as small droplets, rather than being dissolved, in the polymer. Either form is acceptable, but it is preferred that, regardless of the homogeneity of the composition, the release rate of the biologically active substance in vivo remain controlled, at least partially as a function of hydrolysis of the phosphoester bond of the polymer upon biodegradation.

Biodegradability and Release Characteristics

As a drug delivery device, compositions made with the polymer of the invention are useful in providing a polymeric matrix capable of sequestering a biologically active substance and provide predictable, controlled delivery of the substance. In such cases, any remaining polymeric matrix can then degrade to non-toxic residues.

The polymer of formula I is preferably characterized by a release rate of a biologically active substance in vivo that is controlled at least in part as a function of hydrolysis of the phosphoester bond of the polymer during biodegradation. Additionally, the biologically active substance to be released may be conjugated to the phosphorus sidechain R' to form a pendant drug delivery system.

Further, the structure of the sidechain can influence the release behavior of compositions comprising a biologically active substance. For example, it is expected that conversion of the phosphate sidechain to a more lipophilic, more hydrophobic or bulky group would slow down the degradation process. Thus, release is usually faster from polymer compositions with a small aliphatic group sidechain than with a bulky aromatic sidechain.

Further still, other factors such as molecular weight are also important. In general, the greater the molecular weight, the slower biodegradation will be. Accordingly, the greater the molecular weight that can be achieved, the more flexibility a medical device designer has in producing controlled release materials exhibiting the desired release profile. A prolonged release profile can be particularly important in these applications.

EXAMPLES

Example 1
Synthesis of Poly(BHDPT-EOP/TC) 100:50:50

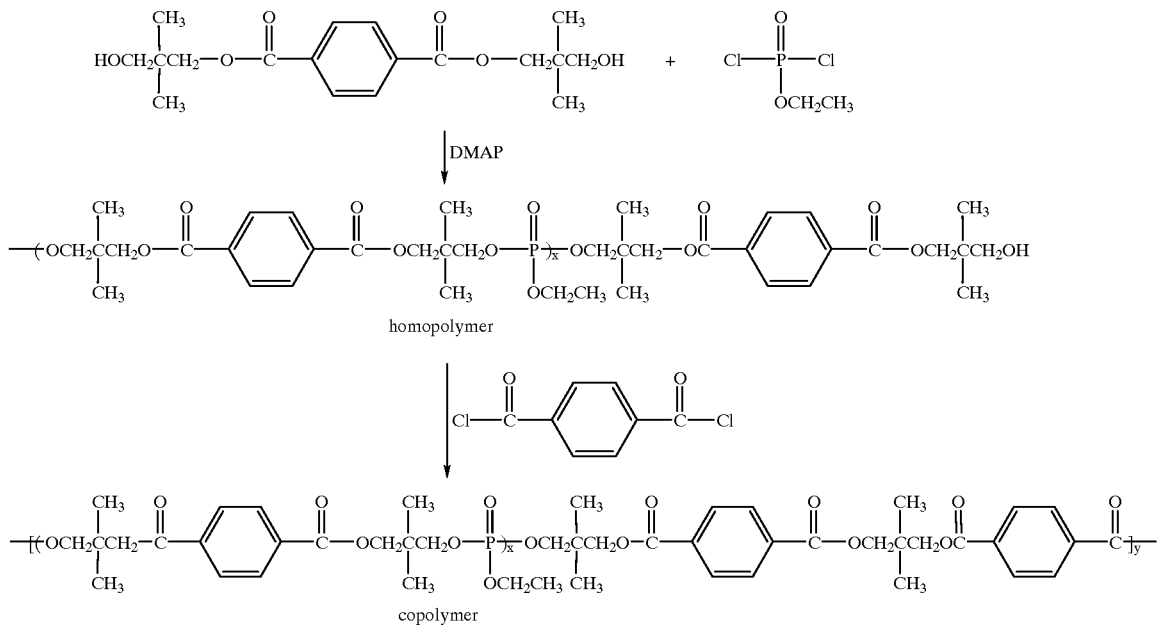

To a 100-ml three-necked round flask were added 6.14 g of Bis(3-hydroxy-2,2-dimethylpropyl terephthalate) (BHDPT), 4.44 g of dimethylaminopyridine (DMAP), and 35 ml of anhydrous toluene under dry nitrogen gas. The mixture was stirred by a magnetic stirring bar and heated with a heating mantle until a clear solution was achieved. The flask was then chilled with dry ice to a temperature of about −70° for 10 minutes, and 1.48 g of ethyl dichlorophosphate (EOP) in 15 ml of toluene was added through an addition funnel over 15 minutes. After the dry ice bath was removed, 1.84 g of terephthalate chloride (TC) in 12 ml of toluene was added dropwise over a 10-minute period. The reaction mixture was then gradually warmed up to room temperature, heated to the reflux temperature for toluene (about 40° C.) over a period of two hours, and maintained at reflux temperature overnight.

The mixture was then filtered, washed three times with saturated NaCl solution, dried over anhydrous $MgSO_4$, before being precipitated in 500 ml of diethyl ether. The molecular weight of the precipitated poly(BHDPT-EOP/TC) (100:50:50) was determined by GPC. The resulting chromatogram, which is shown in FIG. 1, revealed a weight average molecular weight, Mw, of about 78 kDa, about three-fold higher than when the reaction was run in either chloroform or dichloromethane.

Example 2
Shorter Polymerization Time for Poly(BHDPT-EOP/TC)

Figure 2:
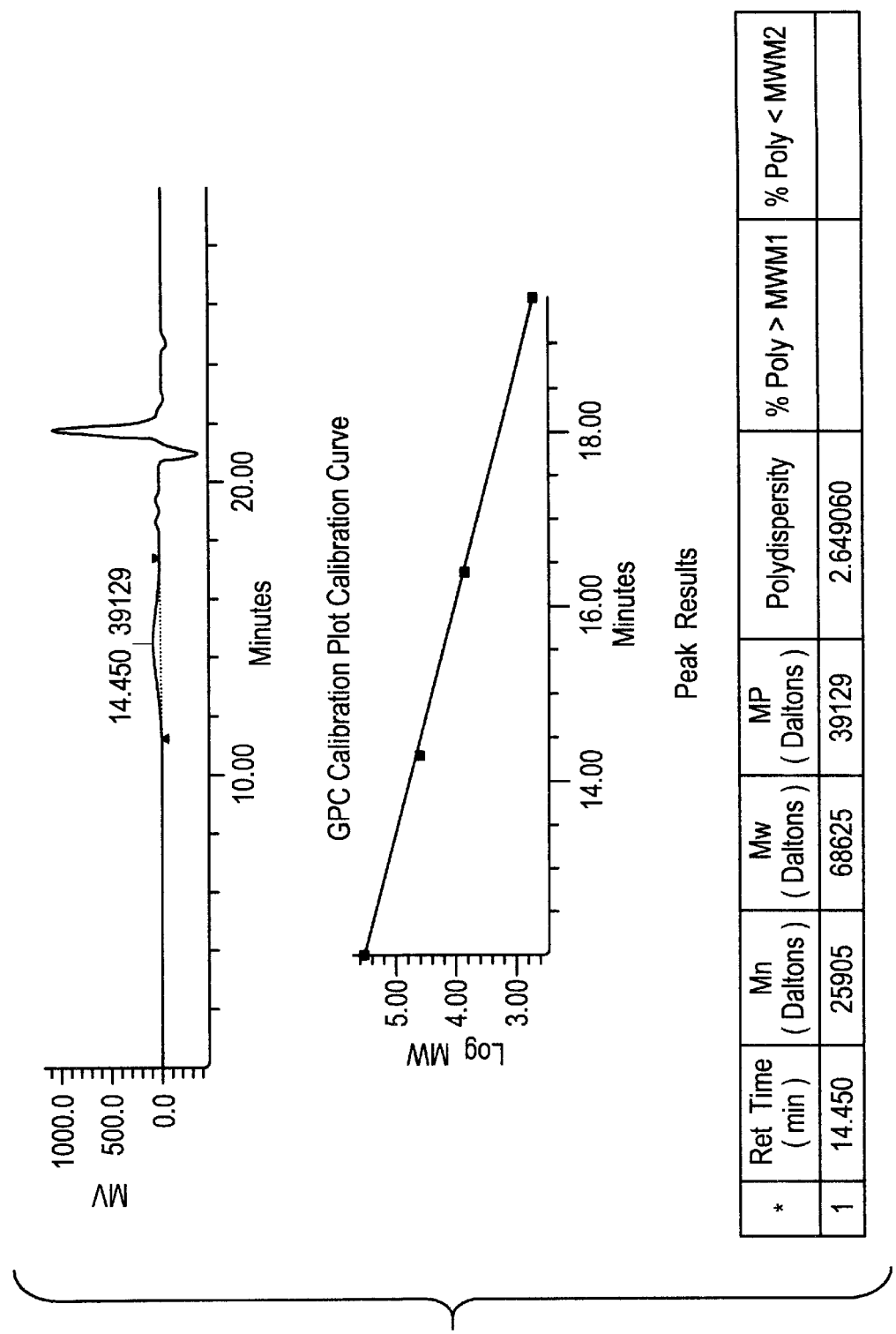
FIG. 2 also shows a GPC chromatogram for poly (BHDPT-EOP/TC) (100:50:50) with a 1.5-hour reflux time in toluene.

The reaction of Example 1 was repeated, except that the reflux time was reduced to only 1.5 hours. A high molecular weight poly(BHDPT-EOP/TC) (11:50:50) was obtained. The resulting chromatogram, as shown in FIG. 2, revealed an Mw value of 69 kDa.

Example 3
Control: Polymerization Run in Dichloromethane

To a 100-ml three-necked round flask were added 3.48 g of Bis(3-hydroxy-2,2-dimethylpropyl) terephthalate (BHDPT), 4.03 g of dimethylaminopyridine (DMAP), and 20 ml of dichloromethane sequentially under dry nitrogen gas. The mixture was stirred with a magnetic stirring bar until a clear solution was achieved. The flask was then chilled with dry ice for ten minutes, and a solution of 0.84 g of ethyl phosphorodichloridate (EOP) (distilled before use) in 15 ml of dichloromethane was added through an addition funnel over a fifteen-minute period. Ten minutes later, 1.05 g of terephthalate chloride (TC) in 20 ml of toluene was added dropwise over ten minutes. The flask containing the reaction mixture was placed in a heating mantel and gradually heated up to reflux temperature. The reaction was maintained under reflux overnight (18 hours).

Figure 3:
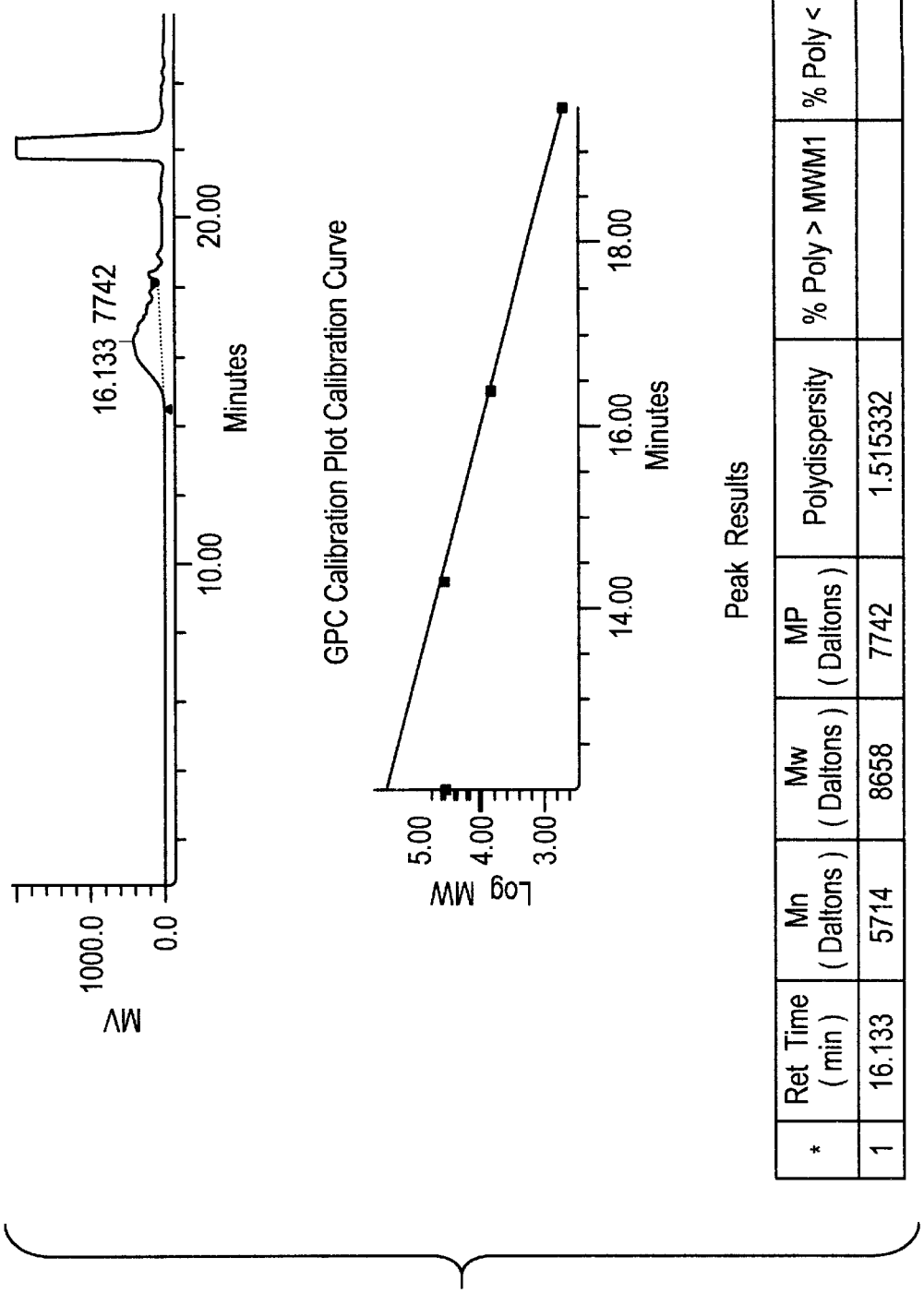
FIG. 3 shows a GPC chromatogram for poly(BHDPT-EOP/TC) (100:50:50) after 18 hours of refluxing in dichloromethane.

After overnight refluxing, the dichloromethane solvent was distilled off and replaced with 100 ml of chloroform. The polymer solution was washed three times with a saturated NaCl solution and dried over anhydrous $MgSO_4$. The polymer product was precipitated out in 500 ml of diethyl ether. The resulting precipitate was filtered off and dried. The GPC chromatogram for this material, shown in FIG. 3, indicated that the polymer product had a Mw of about 9 kDa.

Example 4
Control: Mixture at Rapidly Changing Temperatures

To a 100-ml three-necked round flask were added 5.05 g of Bis(3-hydroxy-2,2-dimethylpropyl)terephthalate (BHDPT), 3.66 g of dimethylaminopyridine (DMAP), and 20 ml of anhydrous toluene sequentially under dry nitrogen gas. The suspended mixture was stirred with a magnetic stirring bar and chilled with dry ice for ten minutes. A solution of 2.43 g of ethyl phosphorodichloridate (EOP) (distilled before use) in 12 ml of toluene was added through an addition funnel over a fifteen-minute period. Then the ice bath was removed, and the reaction flask was immediately immersed in an oil bath that had been pre-heated to 80° C.

Phase separation occurred several minutes later, thought to be due to the rapidly rising reaction temperature. An insoluble cross-linked gel began to form and attach itself to the wall of the flask. The cross-linked gel taken from the walls of the flask was not soluble in common organic solvents, and GPC measurement of the clear liquid phase remaining indicated that no polymer was left present in the solution.

Example 5
Control: Suspended Mixture vs. Solution

To a 100-ml three-necked round flask were added 4.46 g of Bis(3-hydroxy-2,2-dimethylpropyl)terephthalate (BHDPT), 3.23 g of dimethylaminopyridine (DMAP), and 25 ml of anhydrous toluene sequentially under dry nitrogen gas. The suspended mixture was stirred with a magnetic stirring bar and chilled with dry ice for ten minutes. A solution of 2.15 g of ethyl phosphorodichloridate (EOP) (distilled before use) in 15 ml of toluene was added through an addition funnel over a fifteen-minute period. The reaction mixture was then gradually heated up to reflux temperature with a heating mantle.

At this point, a phase separation occurred, and an insoluble cross-linked gel began to form and attach itself to the wall of the flask. The cross-linked gel taken from the walls of the flask was not soluble in common organic solvents, and GPC measurement of the clear liquid phase remaining indicated that no polymer was left present in the solution.

The above results show that selection of solvent, gradual temperature changes, and complete dissolving of the difunctional monomer reactant are important in the success of the process of the invention.

The invention being thus described, it will be obvious that the same may be varied in many ways. Such variations are not to be regarded as a departure from the spirit and scope of the invention, and all such modifications are intended to be included within the scope of the following claims.

We claim:

1. A process for preparing a high molecular weight poly(phosphoester) comprising the recurring monomeric units of formula I:

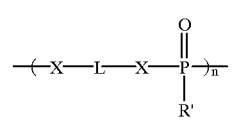

wherein:

X is —O— or —NR"—, where R" is H or alkyl;

L is a divalent organic moiety, with the proviso that L cannot have the formula

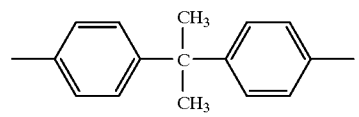

R' is H, alkyl, alkoxy, aryl, aryloxy, heterocyclic, or heterocycloxy; and n is from about 25 to 2000, said process comprising the steps of:

(a) substantially dissolving p moles of a di-XH compound having formula II:

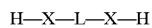

in a solvent comprising at least 75% toluene by volume at a first temperature between about −75° C. and +60° C. to form a reaction mixture;

(b) while maintaining the reaction mixture at the first temperature, adding q moles, where p≈q, of a phosphorodihalo compound of formula III:

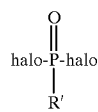

wherein R' is defined as above and "halo" is Br, Cl or I;

(c) gradually increasing said first temperature at a rate of less than about 2° C. per minute as necessary to achieve a second temperature between about 0° C. and 150° C., and mixing the reaction mixture at the second temperature to form the polymer of formula I; and (d) isolating the polymer of formula I.

2. The process of claim 1 wherein X is —O—.

3. The process of claim 1 wherein L comprises an aliphatic ring, a straight-chain or branched aliphatic group, or a carbonyl group.

4. The process of claim 1 wherein L is not halogenated.

5. The process of claim 1 wherein L is selected from the group consisting of:

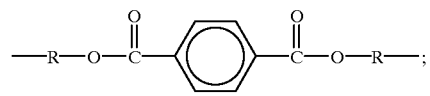

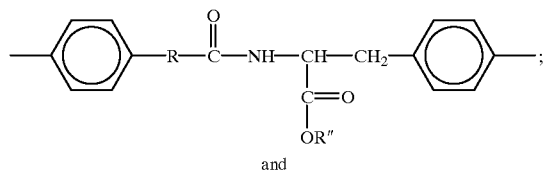

and

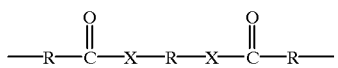

wherein R is branched or straight-chain alkylene and R''' is H, alkyl, aryl or heterocyclyl.

6. The process of claim 1 wherein R' is an alkoxy group.

7. The process of claim 1 wherein the solvent comprises at least 99.9% by volume toluene.

8. The process of claim 1 wherein the amount of solvent in step (a) is about 5–15 ml per gram of compound of formula II.

9. The process of claim 1 wherein an acid acceptor is present in said reaction mixture.

10. The process of claim 9 wherein the acid acceptor is a tertiary amine.

11. The process of claim 1 wherein said first temperature in between about −70° C. and room temperature.

12. The process of claim 1 wherein said first temperature is lower than said second temperature and is raised to said second temperature at a rate of not more than about 1.25° C. per minute.

13. The process of claim 1 wherein said reaction mixture is mixed at said second temperature for a time between about 10 minutes and 18 hours.

14. The process of claim 1 wherein said first temperature changes to said second temperature at a pressure of about atmospheric pressure.

15. The process of claim 1 wherein said polymer of formula I is isolated by quenching a solution of the polymer with a non-solvent or a partial solvent.

16. The process of claim 1 wherein said process is conducted in a batchwise manner.

17. The process of claim 1 wherein said process is continuous.

18. The process of claim 1 wherein the weight average molecular weight of said polymer is at least 50% greater than when dichloromethane is used as the solvent.

19. The process of claim 1 wherein the weight average molecular weight of said polymer is at least 100% greater than when dichloromethane is used as the solvent.

20. A high molecular weight poly(phosphoester) comprising the recurring monomeric units of formula I:

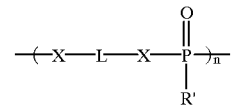

wherein:

X is —O— or —NR''—, where R'' is H or alkyl;

L is a divalent organic moiety, with the proviso that L cannot have the formula:

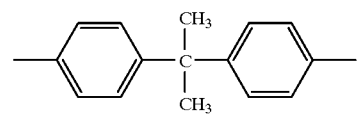

R' is H, alkyl, alkoxy, aryl, aryloxy, heterocyclic, or heterocycloxy; and n is from about 25 to 2000, wherein said polymer is made by a process comprising the steps of:

(a) substantially dissolving p moles of a di-XH compound having formula II:

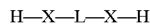

in a solvent comprising at least 75% toluene by volume at a first temperature between about −75° C. and +60° C. to form a reaction mixture;

(b) adding to said reaction mixture at said first temperature q moles, where p≈q, of a phosphorodihalo compound of formula III:

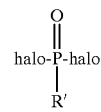

wherein R' is defined as above and "halo" is Br, Cl or I;

(c) gradually increasing said first temperature at a rate of less than about 1.5° C. per minute as necessary to achieve a second temperature between about 0° C. and 150° C., and mixing the reaction mixture at the second temperature to form the polymer of formula I; and (d) isolating the polymer of formula I.

21. The polymer of claim 20 wherein X is —O—.

22. The polymer of claim 20 wherein L comprises an aromatic ring, an aliphatic ring, a straight-chain or branched aliphatic group, or a carbonyl group.

23. The polymer of claim 20 wherein L is not halogenated.

24. The polymer of claim 20 wherein L is selected from the group consisting of:

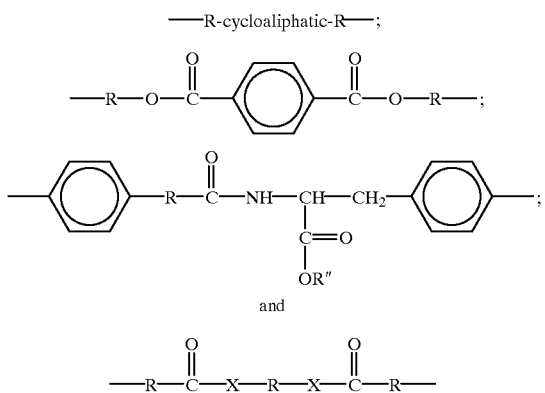

and wherein R is branched or straight-chain alkylene and R''' is H, alkyl, aryl or heterocyclyl.

25. The polymer of claim 20 wherein R' is an alkoxy group.

26. The polymer of claim 20 wherein the solvent comprises at least 99.9% by volume toluene.

27. The polymer of claim 20 wherein the amount of solvent in step (a) is about 5–15 ml per gram of compound of formula II.

28. The polymer of claim 20 wherein an acid acceptor is present in said reaction mixture.

29. The polymer of claim 28 wherein the acid acceptor is a tertiary amine.

30. The polymer of claim 20 wherein said first temperature in between about −70° C. and room temperature.

31. The polymer of claim 20 wherein said first temperature is lower than said second temperature and said first temperature is raised to said second temperature at a rate of not more than about 1.25° C. per minute.

32. The polymer of claim 20 wherein said reaction mixture is mixed at said second temperature for a time between about 10 minutes and 18 hours.

33. The polymer of claim 20 wherein said first temperature changes to said second temperature at a pressure of about atmospheric pressure.

34. The polymer of claim 20 wherein said polymer of formula I is isolated by quenching a solution of the polymer with a non-solvent or a partial solvent.

35. The polymer of claim 20 wherein said process is conducted in a batchwise manner.

36. The polymer of claim 20 wherein said process is continuous.

37. The polymer of claim 20 wherein the weight average molecular weight of said polymer is at least 50% greater than when dichloromethane is used as the solvent.

38. The polymer of claim 20 wherein the weight average molecular weight of said polymer is at least 100% greater than when dichloromethane is used as the solvent.

* * * * *